United States Patent [19]
Yokota et al.

[11] Patent Number: 5,735,308
[45] Date of Patent: Apr. 7, 1998

[54] AUTOMATIC CONSTANT-PRESSURE REGULATING LIFT DEVICE

[75] Inventors: Hiroshi Yokota; Shingo Yokota, both of Hiroshima, Japan

[73] Assignee: Kabushiki Kaisha Yokota Seisakusho, Hiroshima-ken, Japan

[21] Appl. No.: 582,998

[22] PCT Filed: Aug. 31, 1994

[86] PCT No.: PCT/JP94/01432

§ 371 Date: Jan. 23, 1996

§ 102(e) Date: Jan. 23, 1996

[87] PCT Pub. No.: WO95/06834

PCT Pub. Date: Mar. 9, 1995

[30] Foreign Application Priority Data

Sep. 2, 1993 [JP] Japan ............... 5-218271

[51] Int. Cl.[6] ............... F16K 17/22
[52] U.S. Cl. ............... 137/488; 137/489.5; 137/492.5
[58] Field of Search ............... 137/488, 489.5, 137/492, 492.5

[56] References Cited

U.S. PATENT DOCUMENTS

| | | | |
|---|---|---|---|
| 583,269 | 5/1897 | Sellew | 137/489.5 |
| 1,000,729 | 8/1911 | Gloeckler | 137/489.5 |
| 4,972,870 | 11/1990 | Changnian et al. | 137/488 X |

FOREIGN PATENT DOCUMENTS

| | | |
|---|---|---|
| 61-6571 | 1/1986 | Japan. |
| 3-163277 | 7/1991 | Japan. |

*Primary Examiner*—Stephen M. Hepperle
*Attorney, Agent, or Firm*—Ladas & Parry

[57] ABSTRACT

The present invention relates to an automatic constant-pressure lift valve provided with a pilot valve unit having an A valve unit and a B valve unit, and an external control force applying means that can be simply adjusted to set a predetermined valve-outlet pressure.

A main valve unit is constructed so that an abnormal rise in the valve-outlet pressure can be avoided at start and stop and continuous operation of a pumping or conveying pump facility. The automatic constant-pressure lift valve has a construction capable of easily maintaining watertightness when the line is shut off.

The pilot valve unit is not provided with any fixed flow restriction regulating passage, such as a needle valve. When the main valve unit, and the A valve unit and the B valve unit of the pilot valve unit are clogged, those valves open automatically for automatic cleaning.

This constant-pressure lift valve has an excellent industrial effect.

1 Claim, 4 Drawing Sheets

5,735,308

1

AUTOMATIC CONSTANT-PRESSURE REGULATING LIFT DEVICE

TECHNICAL FIELD

The present invention relates to an automatic constant-pressure regulating lift valve with automatic flow restriction regulating passage, to be installed in a liquid transportation line, capable of being conveniently used for water conveyance and water distribution, requiring little trouble for management, omitting all fixed flow restriction regulating passages including needle valves from a pilot valve so that the valve can be easily constructed in large dimensions and can be used under high-pressure, said lift valve being provided with valve structures having valve elements capable of automatically moving away from the corresponding valve seats for automatic cleaning when the valve structures are clogged.

In this specification, "water" is the general term for liquids.

BACKGROUND ART

A conventional automatic regulating lift valve widely used for automatically regulating the pressure of a liquid being transported through a line is provided with a pilot valve that detects the valve-outlet pressure of a liquid in the outlet, and operates a piston or a diaphragm for driving a main valve unit by a pilot valve unit operated by restricting the flow of the liquid with a fixed flow restriction regulating line, such as a needle valve.

Although the theoretical performance of such a conventional automatic regulating lift valve has been favorably evaluated, when practically using the automatic regulating lift valve, anxiety about difficulties in maintenance and management, and durability is unavoidable. For example, a conventional valve of a structure shown in FIG. 4 has the following two problems which are difficult to solve.

(1) A sealing member 6s attached to the periphery of a main valve driving member 6 in contact with a cylindrical wall 8 must be capable of perfect watertight sealing to prevent leakage of the liquid when a main valve unit is shut off. Therefore various sealing means have been tested and a bellows or a diaphragm is employed as the sealing member 6s for perfect watertight sealing. However, such a conventional valve, when formed in large dimensions or for handling high-pressure liquid, is not free from problems in the durability of the sealing member and from problems in machining accuracy and still involves troublesome maintenance work.

(2) Although the main valve unit must be driven moderately to avoid the hunting of the pressure due to rapid flow control operation, the conventional valve provided with a pilot valve unit disposed in a connecting passage Q connected to an outlet passage c in which a valve-outlet pressure prevails needs a flow restriction regulating valve S, such as a needle valve, in a connecting passage P. This fine fixed passage is liable to be clogged with sand grains and dust, causing troubles. Therefore, the conventional valve needs a strainer or the like, and a general-purpose pressure reducing valve, particularly, a large general-purpose pressure reducing valve for high-pressure liquid, is difficult to use except when the pressure reducing valve is applied to handling clean water.

DISCLOSURE OF THE INVENTION

The present invention provides an automatic constant-pressure lift valve solving those problems in the conventional valves, provided with a pilot valve unit not provided with any fixed flow restriction regulating passage, protected from clogging and having a construction that does not leak water when the main valve unit is shut off and is capable of continuously regulating the valve-outlet pressure at a desired level.

An automatic constant-pressure lift valve in accordance with the present invention, as will be apparent from the following description of preferred embodiments thereof, comprises a main valve opening pilot valve A (hereinafter referred to as "A valve unit") that operates for opening when the valve-outlet pressure drops below the predetermined level, and a main valve closing pilot valve B (hereinafter referred to as "B valve unit") that operates for opening when the valve-outlet pressure increases beyond the predetermined level. These valve units maintain a substantially closed state when the valve-outlet pressure is at a predetermined level, by simple adjustment of an external control force applying means. The valve-outlet pressure is regulated at the predetermined level by cooperative action of the A valve unit and the B valve unit.

As mentioned above, the principal operating units of the automatic constant-pressure lift valve are not provided with any fixed flow restriction regulating passage, such as a needle valve, the valve units are capable of performing valve opening operation and automatic cleaning operation according to variation of the valve-outlet pressure to prevent troubles in the passages due to clogging. Furthermore, the sealing member is attached to the main valve driving member 6 need not be capable of strict watertight sealing. Thus, the automatic constant-pressure lift valve of the present invention is economically advantageous and is easy to maintain and manage.

BEST MODES FOR CARRYING OUT THE INVENTION

Figure 1:
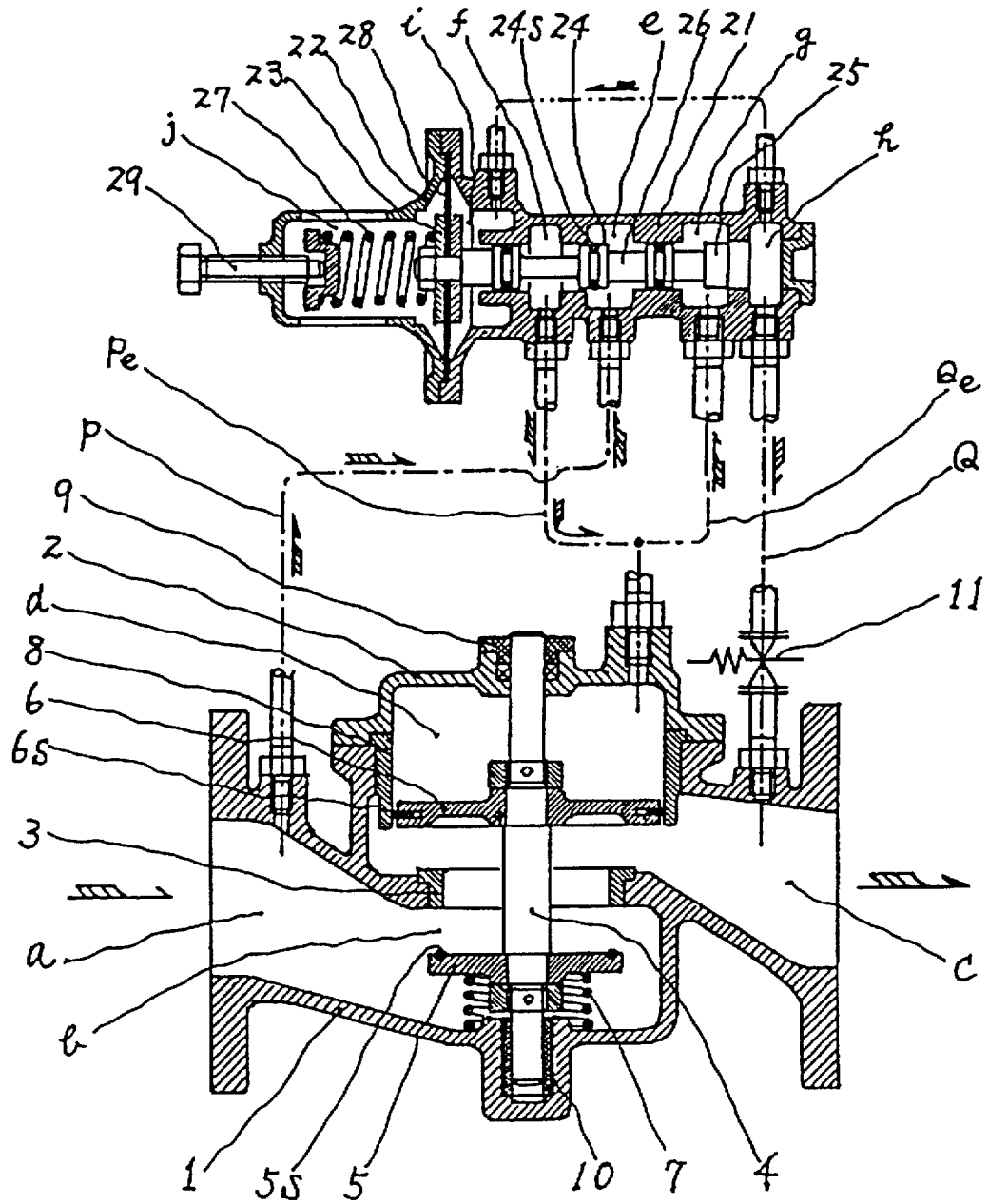
FIG. 1 is a sectional view of an automatic constant-pressure lift valve of a first embodiment according to the present invention comprising two valve units (A valve unit and B valve unit) provided with two valve elements disposed coaxially in alignment with a valve axis so as to slide axially to open and close ports for a set of external control force applying means.

The present invention will be described in detail with reference to the accompanying drawings. Referring to FIG. 1, a main valve body 1 has an inlet passage a and an outlet passage c, a bonnet 2 is put on the valve body 1, and a valve seat member 3 is supported in the valve body 1. A main valve unit comprises a main valve element 5 disposed on the upstream side of the valve seat member 3, a cylindrical member 8 defining a main valve driving pressure chamber d, a main valve driving member 6 slidably fitted in the cylindrical member 8, a sealing member 6s attached to the main valve driving member 6 to seal the main valve driving pressure chamber d, and a main spindle 4 supporting the main valve element 5 and the main valve driving member 6 thereon. A main valve coil spring 7 is interposed between the main valve element 5 and the main valve body 1 so as to bias the main valve element 5 in a direction to close the main valve opening b. The pressure receiving area of the main valve driving member 6 is slightly greater than that of the main valve element 5. The sealing function of the sealing member 6s attached to the main valve driving member 6 may be of such a degree as to be capable of providing a low-degree watertightness that roughly prevents leakage because a sealing member 5s attached to the main valve element 5 and a sealing member 24s attached to an A valve element 24 included in a pilot valve unit provide a perfect watertight sealing effect when the main valve unit is closed.

The A valve unit of the pilot valve unit comprises a valve body 21 having an A valve chamber e, an A valve seat chamber f and a valve-outlet pressure chamber i, a bonnet 22 put on the valve body, a pressure receiving plate 23, a diaphragm member 28, the A valve element 24, and a spindle 26 supporting the A valve element 24 and fastened to the pressure receiving plate 23. A coil spring 27, i.e., an external control force applying means, is contained in a coil spring chamber j of the bonnet 22. The sealing member 24s is attached to the A valve element 24 for watertight sealing when the main valve unit is closed.

A B valve unit has a B valve chamber g and a B valve seat chamber h formed in the valve body 21. A B valve element 25 is secured integrally to the spindle 26. The B valve element 25 need not be fitted in a highly water-tight state in the valve body 21 and may allow slight leakage.

The inlet passage a and the A valve chamber e of the A valve unit are interconnected by a connecting line P, and the A valve seat chamber f of the A valve unit and the main valve driving pressure chamber d of the main valve unit are interconnected by a connecting line Pe. The outlet passage c in which an valve-outlet pressure prevails and the B valve seat chamber h of the B valve unit are interconnected by a connecting line Q. The B valve chamber g of the B valve unit and the main valve driving pressure chamber d are interconnected by a connecting line Qe. The valve-outlet pressure chamber i of the A valve unit is connected via a connecting line and via the B valve seat chamber h of the B valve unit to the outlet passage c in which a valve-outlet pressure prevails.

Figure 2:
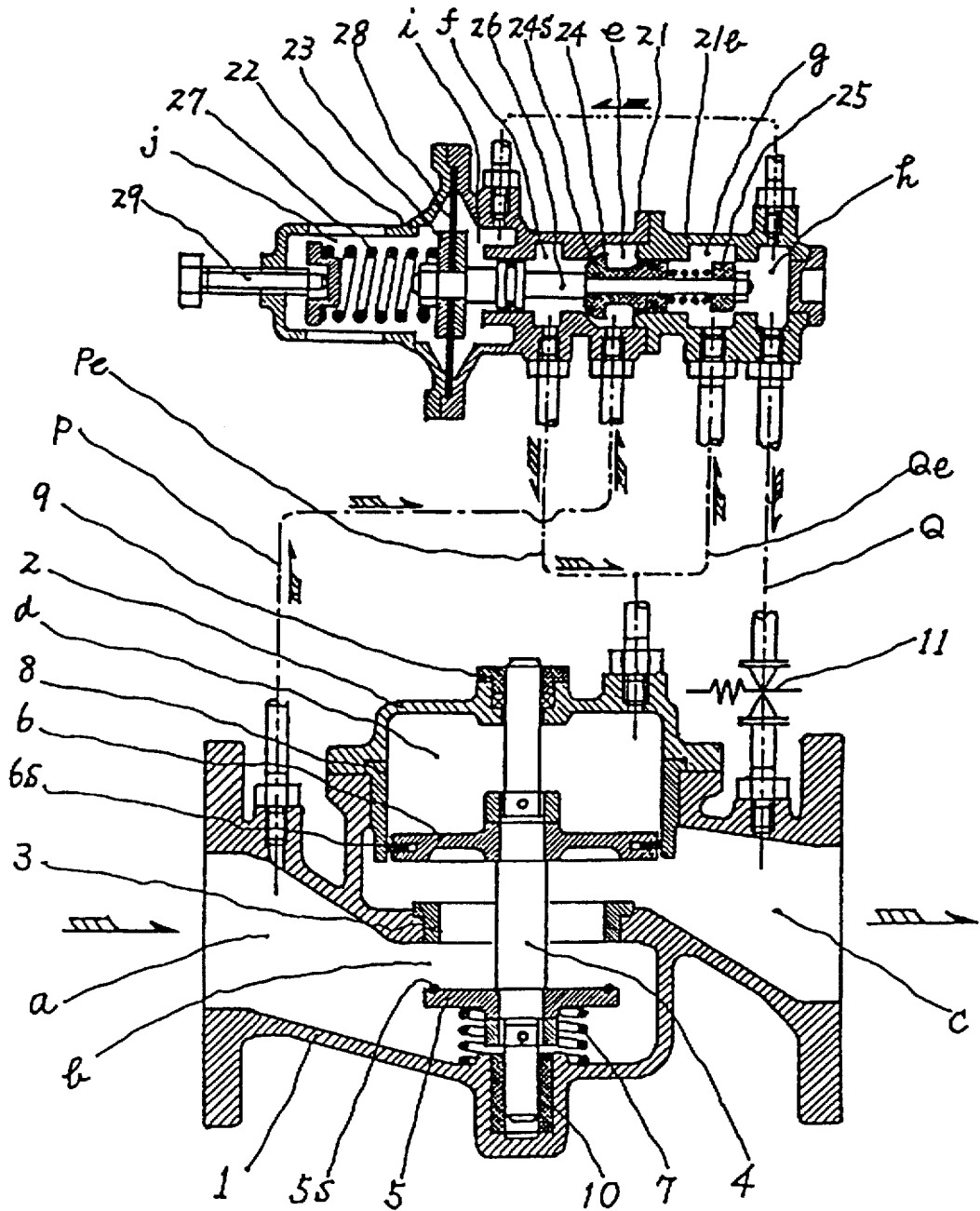
FIG. 2 is a sectional view of an automatic constant-pressure lift valve of a second embodiment according to the present invention, which is substantially the same in construction as that shown in FIG. 1 but has properly slidable valve elements and valve stems.
Figure 3:
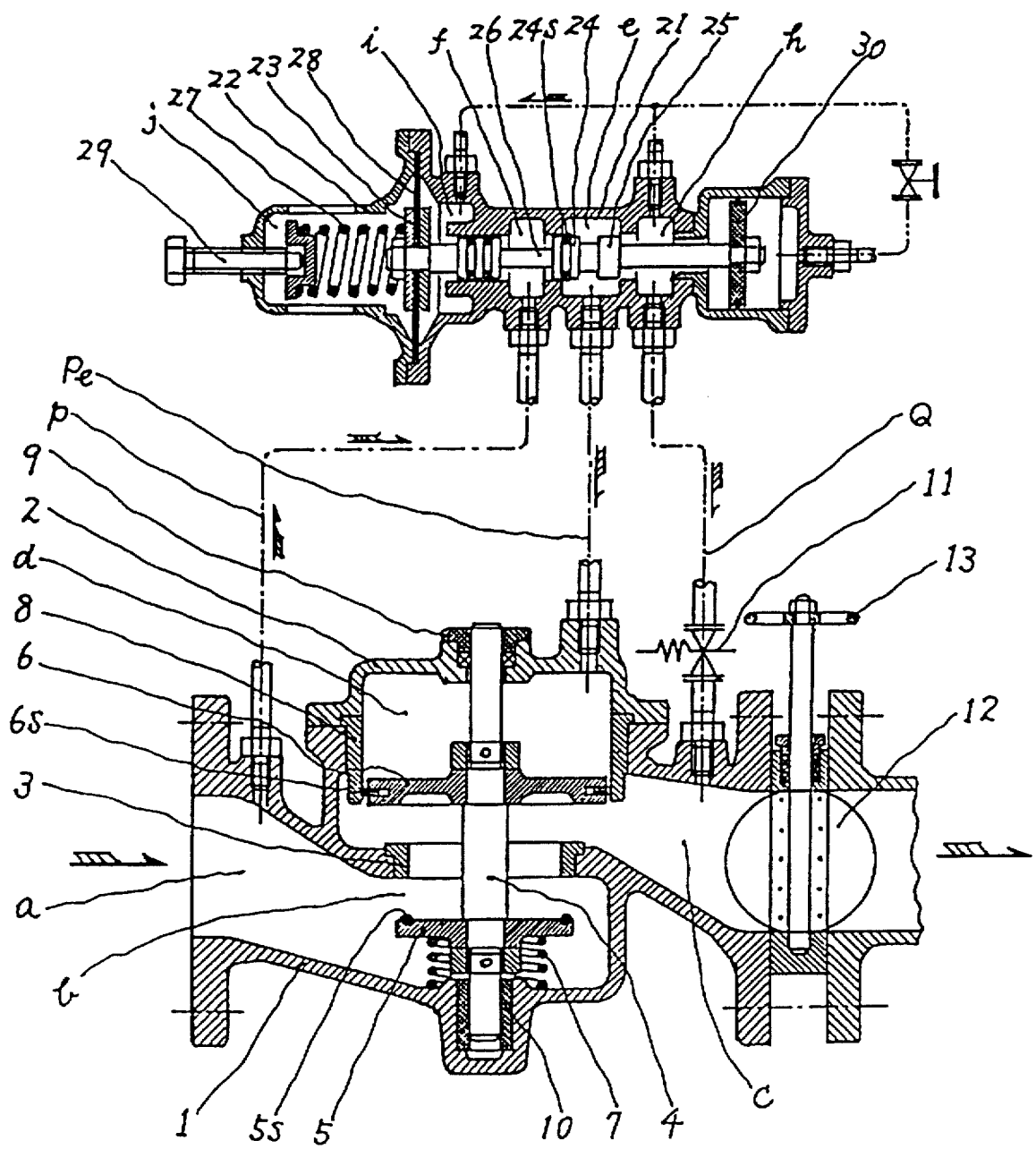
FIG. 3 is a sectional view of an automatic constant-pressure lift valve of a third embodiment according to the present invention, which is substantially the same in construction as that shown in FIG. 1 but has an A valve element and a B valve element disposed in a chamber, provided with a pilot valve unit capable of gradual valve operation in cooperation with a damping mechanism, and provided with an adjustable orifice valve in an outlet passage.
Figure 4:
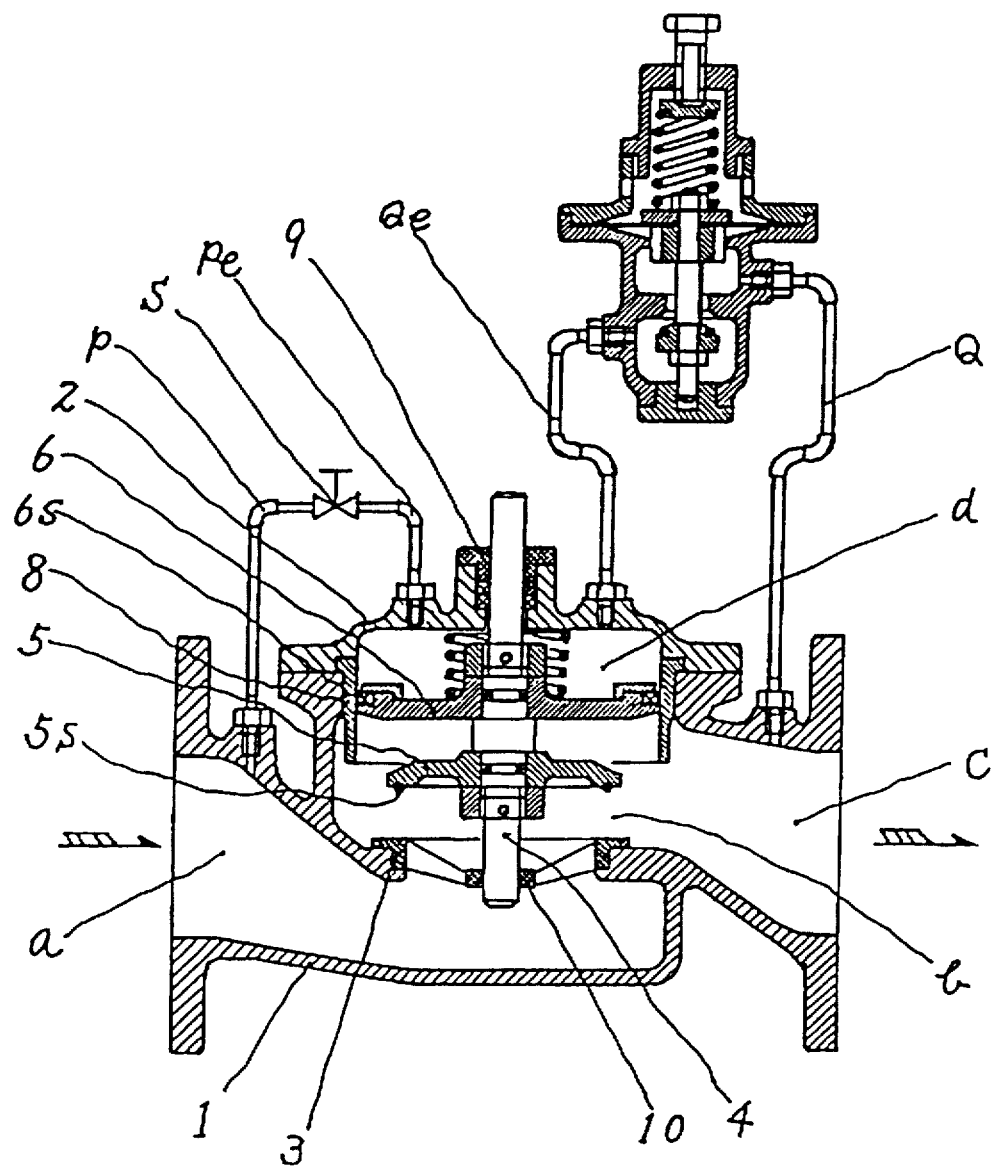
FIG. 4 is a sectional view of a generally known prior art automatic constant-pressure lift valve.

As shown in FIG. 1 to 3, in automatic constant-pressure lift valves in accordance with the present invention, the main valve element 5 biased by the main valve coil spring 7 is disposed on the upstream side of the valve seat member 3, the main valve driving member 6 is disposed on the downstream side of the valve seat member 3, and the A valve unit of the pilot valve unit is interposed between the main valve driving pressure chamber d and the inlet passage a in which the valve-inlet pressure prevails. Further, the B valve unit of the pilot valve unit is interposed between the main valve driving pressure chamber d and the outlet passage c in which the valve-outlet pressure prevails. Thus, the construction of the main valve unit of the automatic constant-pressure lift valves in accordance with the present invention exhibits an excellent operating characteristic that avoids an abnormal rise of the secondary pressure or valve-outlet pressure even if a main pump is started suddenly.

The automatic constant-pressure lift valves embodying the present invention and shown in FIGS. 1 to 3 are provided each with a safety valve 11 suitable for the associated line and connected at an appropriate position to the outlet passage c for the safety management of associated facilities.

In the embodiment shown in FIG. 3, a damping mechanism 30 is connected to a spindle 26 included in a pilot valve unit to control the movement of pilot valve elements, i.e., an A valve element and a B valve element, so that the pilot valve elements move gradually. An adjustable orifice valve 12 provided with an operating handle 13 is disposed in an outlet passage c to enable the automatic constant-pressure lift valve to function for adjustable constant flow control.

Fundamental operation will be described below with reference to FIG. 1. When water is transported through a liquid transportation line provided with the automatic constant-pressure lift valve of this embodiment, the pressure in the outlet passage c is yet lower than a predetermined pressure and the force exerted by the coil spring 27 of the pilot valve unit is higher than the force applied by the valve-outlet pressure in the valve-outlet pressure chamber i in the initial stage. Therefore, the A valve element 24 is at its fully opening position and the B valve element 25 is at its full closing position, so that the water having the valve-inlet pressure flows from the inlet passage a through the connecting line P, the A valve chamber e and the A valve seat chamber f and the connecting line Pe into the main valve driving pressure chamber d of the main valve unit. Consequently, the main valve driving member 6 having a pressure receiving area greater than that of the main valve element 5 is moved by a pressure corresponding to the difference in pressure receiving area between the main valve driving member 6 and the main valve 5 to lift the main valve element 5 off the valve seat member 3 and, consequently, water starts flowing through the passages a, b and c.

After the secondary pressure or the valve-outlet pressure has reached the predetermined level, the A valve element 24 of the A valve unit and the B valve element 25 of the B valve unit of the pilot valve unit move according to the valve-outlet pressure that varies according to variation of the water consumption rate at the downstream side to control the internal pressure of the main valve driving pressure chamber d, whereby the position of the main valve element 5 is regulated to maintain a predetermined valve-outlet pressure. While the valve-outlet pressure is stable at a predetermined pressure, both the A valve element and the B valve element are held stable substantially at their closing positions.

When the downstream side stops using water, that is, the downstream line is shut off, the valve-outlet pressure increases gradually, and the valve-outlet pressure acting on the pressure receiving plate 23 of the pilot valve unit overcomes the resilience of the coil spring 27. As a result, the A valve element 24 is moved to the fully closing position, and the B valve element is moved to the fully opening position so that the internal pressure of the main valve driving pressure chamber d coincides with the valve-outlet pressure. Consequently, the main valve element 5 is moved toward the closing position by the difference in axial thrust between the valve-inlet pressure and the valve-outlet pressure, and the valve opening b is closed to maintain the downstream side at the predetermined valve-outlet pressure.

Naturally, the predetermined valve-outlet pressure can be adjusted by adjusting the resilience of the coil spring 27 by operating an adjusting bolt 29.

Parts of the structure in accordance with the present invention required to exert a perfectly watertight sealing effect after the downstream line has been shut off are the sealing member 5s attached to the main valve element 5 and the sealing member 24s attached to the A valve element 24. Both the sealing members 5s and 24s are readily available conventional parts.

The main valve unit, the A valve unit and the B valve unit have an excellent function to be opened automatically for automatic cleaning when the valve-outlet pressure varies due to clogging caused by sand grains, dust or the like. Accordingly, the automatic constant-pressure lift valve need not be provided with any fine-mesh strainer or the like and is advantageous in respect of maintenance and management.

The operations of the embodiments shown in FIGS. 2 and 3 are essentially the same as that of the embodiment shown in FIG. 1 and hence the description thereof will be omitted.

As mentioned briefly in connection with the brief description of the drawings, in each of the embodiments shown in FIGS. 1 to 3, the A valve element 24 of the A valve unit and the B valve element 25 of the B valve unit move together with the spindle 26 and those valve elements 24 and 25 do not interfere with each other. In the embodiment shown in FIG. 2, the valve elements 24 and 25 are mounted on the spindle 26 with sliding means interposed therebetween so that the valve elements 24 and 25 are axially ajustable relative to each other but maintain effective interlocked movement. The embodiment shown in FIG. 3, similarly to the embodiment shown in FIG. 1, employs an opening/closing mechanism of a cylinder-piston type, and has the A valve element and the B valve element contained in the valve chamber e.

In the automatic constant-pressure lift valve in accordance with the present invention, the arrangement (positional relation) and the combination of the chambers e, f, g, h and i may be changed within the teaching of the present invention, and the present invention is not limited to the preferred embodiments specifically described herein. It will be readily understood that the external control force applying means need not be limited to an elastic member, such as the coil spring 27; the same may be a weight connected through a link to apply a fixed force, a force amplifying device associated therewith, a pneumatic device or a hydraulic device.

A bellows may be used instead of the sealing diaphragm 28 attached to the pressure receiving plate 23 of the pilot valve unit for the watertight sealing of the valve-outlet pressure chamber i or an O-ring may be attached to the sliding surface of the pressure receiving plate for the same purpose.

Although the embodiments described herein are provided with the sealing members 5s and 24s for watertight sealing, naturally, those sealing members may be omitted when the parts provided with the sealing members 5s and 24s are designed and manufactured with an accuracy suitable for watertight sealing.

The component parts of the valve of the present invention may be conventional ones.

INDUSTRIAL APPLICABILITY

The automatic constant-pressure lift valve in accordance with the present invention embodies a novel technical idea; employs a pilot valve unit without fixed restriction regulating passage; has a structure that enables the valve elements to move for valve opening operation and automatic cleaning operation to avoid troubles attributable to clogging with sand grains and dust; is capable of perfectly watertight sealing when the line is shut off; has the main valve unit capable of avoiding an abnormal rise in the valve-outlet pressure at the start and stop, and during the continuous operation of the associated pumping or conveying facility; and is a virtually maintenance-free valve.

Accordingly, the automatic constant-pressure lift valve of the present invention can be designed and fabricated without difficulty; has high reliability and exerts a high economic effect.

We claim:

1. An automatic constant-pressure lift valve having a main valve element disposed in a valve opening formed in a valve body so as to be driven by a pilot valve unit that operates according to variation of the pressure flowing through the valve body; characterized in that:

the main valve element (5) and a main valve driving member (6) are disposed in combination in the main valve body (1) of a main valve unit, the main valve element (5) is disposed at an upstream side of a main valve seat member (3), to form a valve opening (b) between the main valve element (5) and the valve seat member (3), and the main valve driving member (6) is fitted slidably in a cylindrical member (8) at a downstream side of the valve seat member (3) so as to form a main valve driving pressure chamber (d) together with a bonnet (2) put on the main valve body;

the pilot valve unit comprises an A valve unit and a B valve unit which are operated by balance of the valve-outlet pressure of a liquid in the outlet passage of the main valve unit and a force exerted thereon by an external control force applying means, the main valve driving pilot valve unit without fixed restriction passage is constructed by connecting in series the pilot A valve unit and the pilot B valve unit through the main valve driving pressure chamber (d) in a direction from an inlet passage (a) toward an outlet passage (c), said pilot A valve unit operating to open when the valve outlet pressure drops below a predetermined level, said pilot B valve unit operating to open when the valve outlet pressure rises beyond the predetermined level, said pilot valve units remaining closed while the valve outlet pressure is at the predetermined level;

the respective valve elements of the main valve unit, the pilot A valve unit and the pilot B valve unit are arranged to separate instantaneously from the corresponding valve seats, respectively, by variation of the valve-outlet pressure when the same are clogged.

\* \* \* \* \*

UNITED STATES PATENT AND TRADEMARK OFFICE
CERTIFICATE OF CORRECTION

PATENT NO. : 5,735,308

DATED : APRIL 7, 1998

INVENTOR(S) : HIROSHI YOKOTA, et al

It is certified that error appears in the above-identified patent and that said Letters Patent is hereby corrected as shown below:

| | | |
|---|---|---|
| On the title page, item 54, | | "Device" should be -- Valve--. |
| Column 1, | line 2, | "Device" should be -- Valve--. |
| Column 2, | line 29, | "is" should be -- 6s--. |
| Column 3, | lines 51-52, | "automatic constant-pressure lift valves in accordance with" should be -- the main valve units of the embodiments of--; |
| | line 63, | "the main valve unit of" should be deleted. |
| Column 6, | line 20, | delete "element disposed in a valve opening formed in a valve" ; |
| | line 21, | "body so as to be" should be -- unit which is--; |
| | line 23, | "valve body" should be -- main valve unit--; |
| | line 24, | before "element" insert -- unit comprises a main valve--; |
| | line 25, | "are disposed in combination in the" should be -- incorporated in a--; |
| | lines 31 and 32, | delete "at a downstream side", before "valve" insert -- main -- and "seat member (3)" should be -- body --; |
| Column 6, | line 43, | delete "in a direction"; |
| | line 45, | delete "valve" (second occurrence); |
| | line 46, | after "pressure' insert --of the main valve unit--; |
| | line 47, | delete "valve" (second occurrence); |
| | line 49, | delete "valve" (second occurrence); |
| | line 55, | delete "valve" (second occurrence); |
| | line 56, | after "clogged" insert --
2. The automatic constant-pressure lift valve according to claim 1, further comprising an adjustable orifice valve (12) in the outlet passage (c) of the main valve unit.--. |

Signed and Sealed this

Sixth Day of July, 1999

*Attest:*

Q. TODD DICKINSON

*Attesting Officer*     *Acting Commissioner of Patents and Trademarks*